United States Patent
Van Tol et al.

(10) Patent No.: US 9,519,977 B2
(45) Date of Patent: Dec. 13, 2016

(54) LETTERBOX COLORING WITH COLOR DETECTION

(71) Applicant: eBay, Inc., San Jose, CA (US)

(72) Inventors: Ladd Van Tol, Portland, OR (US); Tyler Yong Nugent, Portland, OR (US); Jonathan David Chard, Portland, OR (US); Bradley Roberts, Dublin, CA (US)

(73) Assignee: eBay Inc., San Jose, CA (US)

( * ) Notice: Subject to any disclaimer, the term of this patent is extended or adjusted under 35 U.S.C. 154(b) by 271 days.

(21) Appl. No.: 14/201,683

(22) Filed: Mar. 7, 2014

(65) Prior Publication Data
US 2014/0337723 A1  Nov. 13, 2014

Related U.S. Application Data

(60) Provisional application No. 61/822,846, filed on May 13, 2013.

(51) Int. Cl.
*G06F 17/00* (2006.01)
*G06T 11/00* (2006.01)
(Continued)

(52) U.S. Cl.
CPC ........... *G06T 11/001* (2013.01); *G06F 17/211* (2013.01); *G06Q 30/0601* (2013.01); *G09G 5/00* (2013.01); *G06F 17/3025* (2013.01); *G06F 17/30256* (2013.01); *G06Q 30/02* (2013.01); *G06Q 30/06* (2013.01); *G06Q 30/0603* (2013.01); *G06Q 30/0623* (2013.01); *G06Q 30/0631* (2013.01); *G06Q 30/0641* (2013.01); *G06Q 30/0643* (2013.01); *G06T 5/10* (2013.01); *G09G 2310/0232* (2013.01); *G09G 2340/0442* (2013.01); *G09G 2340/14* (2013.01); *G09G 2360/16* (2013.01)

(58) Field of Classification Search
CPC .. G06F 17/211; G06F 17/3025; G06F 17/408; G06F 17/30256; G06T 11/001; G06T 5/10; G09G 5/024; G06Q 30/0631; G06Q 30/0643; G06Q 30/0603; G06Q 30/02; G06Q 30/0641; G06Q 30/06; G06Q 30/0623; G06Q 30/063
USPC ................................. 715/234–236, 273–275
See application file for complete search history.

(56) References Cited

U.S. PATENT DOCUMENTS

2006/0132872 A1* 6/2006 Beretta ................ H04N 1/6052
358/518
2006/0139492 A1* 6/2006 Ahn ....................... G09G 5/005
348/558

* cited by examiner

Primary Examiner — Quoc A Tran
(74) Attorney, Agent, or Firm — Schwegman, Lundberg & Woessner, P.A.

(57) ABSTRACT

A system comprising a computer-readable storage medium storing at least one program, and a computer-implemented method for generating background for an image. A graphical interface module arranges an image in a display element. The arrangement of the image in the display element defines a space between the perimeters of image and the display element. A color detection module determines an estimate of a color of the image about the perimeter of the image. A background generator module determines a variation of color of the image about the perimeter of the image. The background generator module determines a background based at least on the estimate of the color and the variation of color. A display module provides the arrangement of the image in the display element with the background at least filling a portion of the space defined between the perimeters.

20 Claims, 11 Drawing Sheets

(51) Int. Cl.
   *G06F 17/21*   (2006.01)
   *G09G 5/00*   (2006.01)
   *G06Q 30/06*   (2012.01)
   *G06F 17/30*   (2006.01)
   *G06Q 30/02*   (2012.01)
   *G06T 5/10*   (2006.01)

LETTERBOX COLORING WITH COLOR DETECTION

PRIORITY CLAIM

The present application claims the priority benefit under 35 U.S.C. 119(e) of U.S. Provisional Patent Application Ser. No. 61/822,846, titled "SMART LETTERBOX COLORING WITH EDGE DETECTION," filed May 13, 2013, which is incorporated herein by reference in its entirety.

TECHNICAL FIELD

Example embodiments of the present application generally relate to graphical interfaces and, more particularly, to a system and method for providing images.

BACKGROUND

Marketplaces can be online and/or real world (e.g., brick and mortar). Online marketplaces can include websites or mobile applications where users may buy or sell goods or services (referred to collectively as "items") from a provider of the online marketplace or other users of the online marketplace. The goods or services (referred to collectively as "items") are described in a published listing. Similar to online marketplaces, real-world marketplaces may have websites that allows users to view inventory or interact with the real-world marketplace.

Consumers can be exposed to a variety of advertisements and item listings throughout the consumers' online experience. Given the rapid increase in the number of online marketplaces, customers may become overwhelmed by the number of shopping options and online advertisements. As a result, some marketplaces may not be able to effectively market to consumers.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Figure 1:
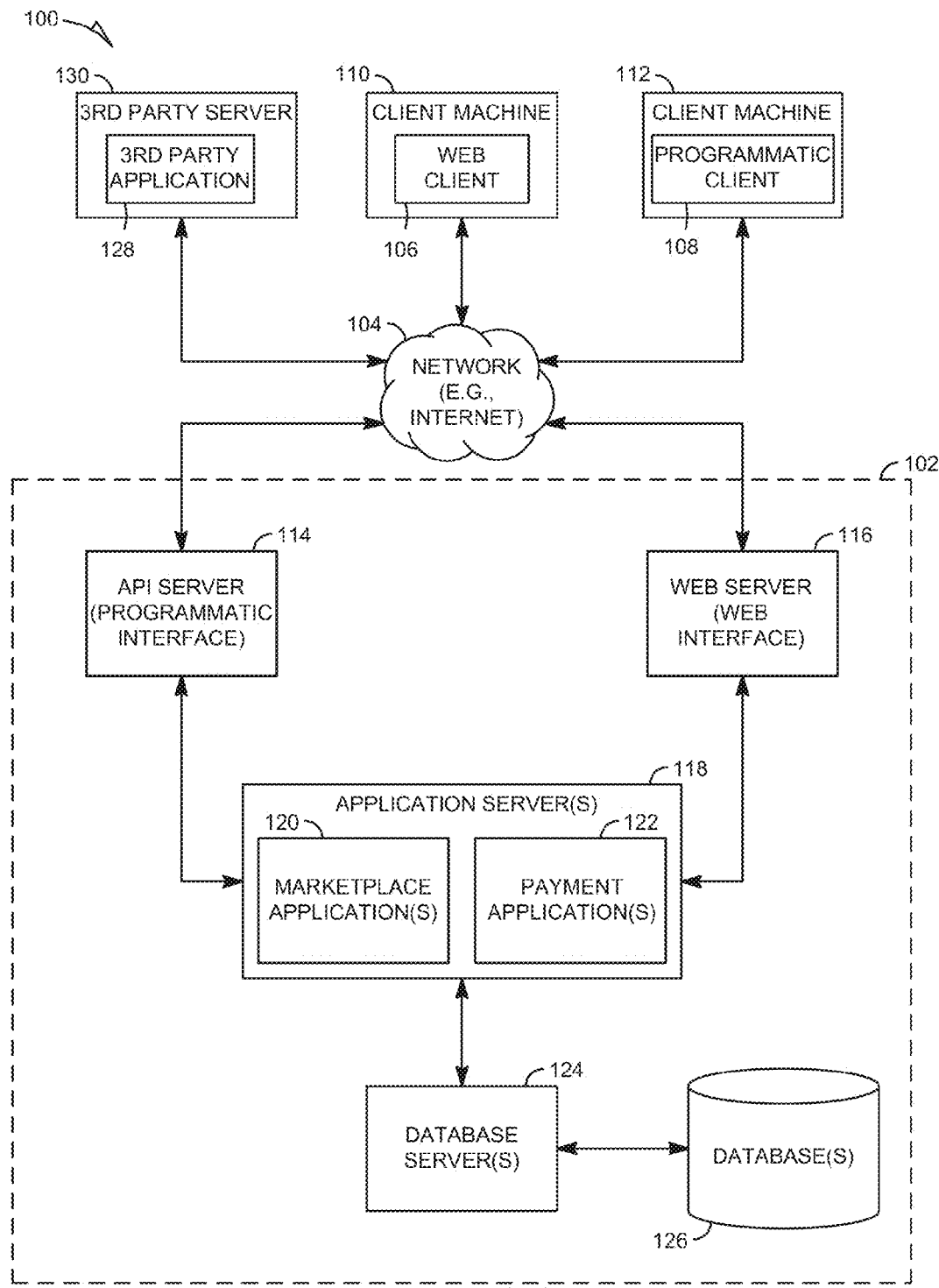
FIG. 1 is a network diagram depicting a client-server system, within which one example embodiment may be deployed.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Example methods and systems displaying images are described. In the following description, for purposes of explanation, numerous specific details are set forth in order to provide a thorough understanding of example embodiments. It will be evident, however, to one skilled in the art that the present invention may be practiced without these specific details.

An online marketplace is a website or mobile application where a user may buy or sell goods or services (referred to collectively as "items") from a provider of the online marketplace or other users of the online marketplace. The items are described in a published listing. The listing may indicate various properties or characteristics of the good, service, or proposed transaction such as brand, make, model, year, category, price (e.g., a current high bid, reserve price, or buy it now price), color, size, condition, sale type (e.g., auction or buy it now), seller, shipping availability and details, location, keywords, categories, or identifiers (e.g., UPC or ISBN code). The listing may include one or more pictures or images of the item being sold.

The online marketplace publishes the listing in a view item page or another webpage. In example embodiments, the view item page includes the description of the good or service and a number of options that can be selected by the user viewing the page. The options may include an option to purchase or bid on the item, an option to watch the item, an option to send a link to the listing in an electronic message (e.g., email, text message, private message within a social network), or to share a link to the listing via a social network. Social networks include, but are not limited to TWITTER™, FACEBOOK™, LINKEDIN™, PINTEREST™, meet-up sites, dating sites, and other sites where users can post content or replies to content.

In some instances, the images may be displayed at different sizes. For example, the images may be viewed on more than one type of device, such as desktop computers and mobile devices including smartphones, tablet computers, and wearable computer devices. These mobile devices may have a smaller display area than more conventional computers. The smaller display area may require that less content be displayed on the device at a particular time or be laid out in an alternate arrangement to increase ease of use.

Furthermore, the images may be displayed on various types of webpages. One example, as stated, is the view item page. A second example is a web page that presents at least a portion of a plurality of listings based on a search result and/or browsing activity ("listings page"). The listings page may provide a smaller display area for the image than the view item page. For example, the display areas for images of the listings page may be a size suitable for displaying thumbnail images. Moreover, the display area of the graphical interface for the image on the listings page may be a different shape than the display area of the view item page. In particular, display elements of a listings page may have uniform aspect ratios and sizes, which may be in contrast to the various aspect ratios of images to be displayed. Accordingly, the images are to be displayed on a variety of display sizes and within a variety of sizes of display elements of the graphical interface.

The images of the items described in the published listings may be provided to the marketplace or other publication service by a user of the marketplace, such as a seller. The seller may capture the image of the item using a camera or a digital image capture device. To take a picture of the item, the user can place the item against a background that may be more or less uniform. For example, some users construct a "photo light box" or photo studio by draping fabric over a frame and positioning the item in the light box to provide a uniform background. Other sellers may simply place the item on a surface having a uniform color (e.g., a white tablecloth placed on a table top) and capture a picture from a desired angle so that the item appears to be in a light box or other more sophisticated piece of equipment. As such, images of items can take on a wide range of background colors and sizes.

When rendered on a device or in a display element having a smaller display, the captured image may be resized to fit within a designated area of the display ("display element"). The dimensions of the image may be proportionally shrunk or cropped to fit within the display element. Particularly when the image is proportionally shrunk, the shape of the image may not match the shape of the display element for the image (e.g., thereby producing a "letterbox"). As a result, when the display area is rendered, the picture may be, by default, bordered on one or more sides by a solid black or white border. The solid border may distract from the image for the user or not otherwise complement the image, causing fewer people to be interested in the item. As a result, sellers and buyers may both be discouraged from using the marketplace.

Systems and methods described herein automatically, without human intervention, determine a background fill and/or coloring scheme used to fill in the letterbox area of the display. As stated, the letterbox area is the area that is designated to include the image that is not actually occupied by the image. The resulting letterbox area may include one or more colors and/or various patterns, shading, shadowing, or other visual effects ("background" or "background fill").

For example, an example embodiment includes a border color averaging and border variance detection algorithm. Both the border color averaging and the border variance detection may be determined or computed in a perceptually linear color space. By way of example, perceptually linear color spaces include color spaces in which a change of an amount in a color value should produce a change approximately proportional to the visual importance. Examples of perceptually linear color space include, but is not limited to, International Commission on Illumination ("CIE") 1931 color space, CIE 1976 color space, CIE 1976 (L*, u*, v*) color space ("CIELUV"), CIE 1976 (L*, a*, b*) color space ("CIELAB"), or CIE 1964 (U*, V*, W*) color space ("CIEUVW"). Perceptually linear color spaces can have an advantage that changes in color approximately matches the change perceived by humans.

Determining an average color of the border pixels can serve as an estimate of the background color of image. In turn, a version of the estimate may serve as a pleasing background fill for an image under certain scenarios. Border color averaging may be performed by calculating an average pixel color from the border pixels. As stated, the average is computed in a perceptually linear color. Thus, if the image is not characterized in a perceptually linear color space (e.g., instead, characterized with an RGB-type color space, luma plus chroma/chrominance-type color space, hue and saturation type color space, CMYK color space, or the like color spaces), then the image may be converted into one of the perceptually linear color spaces before computing the average.

In some cases, the average color of the border may not be a reliable indication of the background color. For example, the background of the image may contain a pattern of multiple bright colors. Thus, the average color may be very different from any of the actual background colors and/or the average color may be a "muddied" color that may not look pleasing applied as the background. Accordingly, in some implementations, images having high border variance may cause the background fill to be a desaturated version of the average color. A standard deviation calculation may be used as the variance detector. Alternates could include statistical variance, average absolute deviation, median absolute deviation, or any other statistical measure or approximation of variance or dispersion.

The level of desaturation may be based on a relationship of the amount of border variance to the amount of desaturation. This process of desaturating the average color of the border by may be implemented with linear/proportional desaturation, an exponential-like desaturation, or a threshold-based desaturation. Once the letterbox coloring is achieved (e.g., achieved by applying a desaturation of the average color), the background fill may be added to the display to be rendered in the letterbox. With the background fill, the image may be rendered without distracting borders, as described below.

Additionally or alternatively, the variance measure may be used to determine whether an image should be smoothly matted, or displayed with an alternate presentation (e.g., displaying with a drop shadow or border). In one embodiment, the background is desaturated to approximately a fully desaturated color and a drop box is placed around the image if the variance of color is greater than a predetermined threshold.

FIG. 1 is a network diagram depicting a client-server system 100, within which one example embodiment may be deployed. A networked system 102, in the example forms a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines/devices 110 and 112.

An Application Program Interface (API) server 114 and a web server 116 are coupled to, and provide programmatic and web interfaces respectively to, one or more application servers 118. The application servers 118 host one or more marketplace applications 120, and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for items that are made available via the marketplace applications 120.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120, 122 could also be implemented as stand-alone software programs, which do not necessarily have networking capabilities.

In addition, while the various marketplace and payment applications 120, 122 have been described above as having separate functionalities, in alternative embodiments these functionalities may be performed by any one or more of the various marketplace and payment applications 120, 122.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TURBOLISTER™ application developed by EBAY INC.™, of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
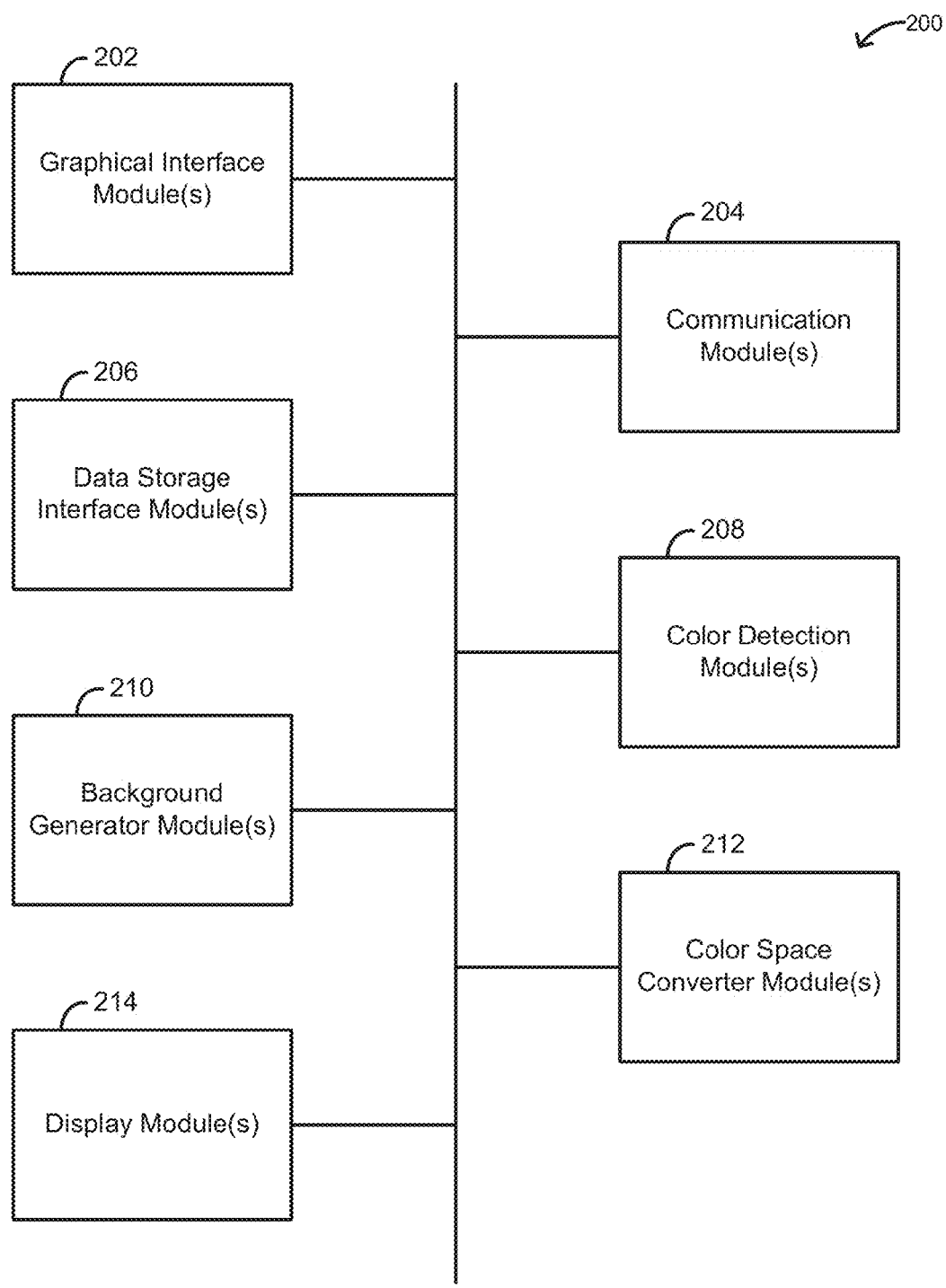
FIG. 2 is a block diagram illustrating an example embodiment of multiple modules forming at least a portion of the client-server system of FIG. 1.

FIG. 2 is a block diagram illustrating an example embodiment of a display system 200 that includes multiple modules 202-214 forming at least a portion of the client-server system 100 of FIG. 1. The modules 202-214 of the illustrated embodiment include a graphical interface module(s) 202, a communication module(s) 204, a data storage interface module(s) 206, a color detection module(s) 208, a background generator module(s) 210, a color space converter modules(s) 212, and a display module(s) 214. In some embodiments, the components of the display system 200 can be included by the marketplace application 120 of FIG. 1. However, it will be appreciated that in alternative embodiments, one or more components of the display system 200 described below can be included, additionally or alternatively, by other devices, such as one or more of the servers 114, 116, 118, 130, the network 104, and/or the client machines 110, 112 of FIG. 1.

Accordingly, the modules 202-214 of the display system 200 may be hosted on dedicated or shared server machines that are communicatively coupled to enable communications between server machines. Each of the modules 202-214 are communicatively coupled (e.g., via appropriate interfaces) to each other and to various data sources, so as to allow information to be passed between the modules 202-214 or so as to allow the modules 202-214 to share and access common data. The various modules 202-214 may furthermore access one or more databases servers 124 that facilitate access to one or more databases 126.

The display system 200 may provide a one or more images for display on a user device. As stated, the images may be displayed in respective display elements or containers ("display elements") that may not have similar shapes as the respective image to be displayed (e.g., an image and its display container may be rectangles of different aspect ratios). For example, each of the images can correspond to an image supplied by a user (e.g., seller) for display on the user's webpage, listing, and/or search results. Because the image may be displayed on a variety of devices (e.g., desktop, laptop, mobile device, wearable computing devices such as an optical head-mounted display), and because the image may be displayed for a variety of purposes (e.g., a large display on the view item page or a smaller thumbnail displayed as part of a listings page), it may be difficult for the seller determine an appropriate size of the image to properly fit each of the potential display elements. Moreover, changes to the graphical interface over time—e.g., due to updates and new version—may produce changes to the sizes of the display elements. As a result, the image may not always entirely fill the associated display element. Accordingly, the perimeters of the image and the display element may define a space. The display system 200 may automatically determine a background fill (e.g., a color matte and/or border) to fill the space. The determination of the background fill may be performed dynamically in response to a user request such as a request to render the corresponding view item page or a search request. In one aspect, coloring the space may provide a visually appealing look that may increase web traffic to the user's web page.

To this end, the display system 200 is shown to include the graphical interface module 202 operatively coupled to the communication module 204, the data storage interface module 206, the color detection module(s) 208, the background generator module(s) 210, the color space converter modules(s) 212, and the display module(s) 214. The graphical interface module 202 may be a hardware-implemented module which may control the operation of the various modules 204-212 as well as the flow of information, data, and/or signals between the modules 202-214 for providing a graphical interface to be displayed on a user's device. For example, the graphical interface module 202 may be configured to arrange an image in a display element of the graphical interface. The graphical interface may, for instance, correspond to the view page and/or a display of multiple listings (e.g., a search results page). The arrangement of the image in the display element may define a space between the perimeter of the image and the perimeter of the display element. For example, the space may correspond to a letterbox formed by fitting an image in a display element of a different aspect ratio. The graphical interface module 202 will be described in greater detail later in connection with FIGS. 3A-3C.

The communication module 204 may be a hardware-implemented module which may facilitate the flow of the information, data, and/or signals between the modules 202-214, in accordance with the graphical interface module 202. In addition, the communication module 204 can be configured to support communication of the display system 200 between the servers and client machines of FIG. 1.

The data storage interface module 206 may be a hardware-implemented module which may store data and provide access to the stored data. Data may be related to parameters of background fill and/or related to the data of the graphical interface elements for display. One embodiment of an example data structure that may be stored and provided by the storage interface module will be described in greater detail later in connection with FIG. 4.

The color detection module 208 may be a hardware-implemented module which may determine an estimate of a color of the image. For example, the estimate may correspond to a color about the perimeter (or some portion of the perimeter) of the image. In one embodiment, the color detection module 208 determines the estimate of the color by determining a central tendency of a portion of the image about the perimeter of the image. Examples of central tendencies can include one or more of an average ("mean"), a median, a mode, and the like measures suitable for characterizing the collective color of the portion of the image. Below, embodiments will be described by way of example in the context of determining an average color. However, it will be appreciated that any suitable central tendency measure of the color can be used.

The average color may be determined in a perceptually linear color space, such as, but is not limited to CIE 1931 color space, CIE 1976 color space, CIELUV color space, CIELAB color space, or CIEUVW color space. As stated, a perceptually linear color space may be a color space in which a change of an amount in a color value should produce a change of about the same visual importance. Perceptually linear color spaces can have an advantage of approximately matching changes in color to changes in human color perception. Accordingly, the color detection module 208 may determine a basis of a color of the background fill that may result in a pleasing appearance. The color detection module 208 will be described in greater detail later in connection with FIGS. 3A and 7.

The background generator module 210 may be a hardware-implemented module which may determine a variation of color of the image about the perimeter of the image. For example, background generator module 210 may determine a variance of the color of the portion about the perimeter that is associated with the estimate of the color generated by the color detection module 208. Below, embodiments will be described by way of example in the context of determining a variance of color. However, it will be appreciated that any suitable measure can be used for determining a variance or distribution of color about the estimate of the color.

After the average color and the variation of color have been determined, the background generator module 210 may determine a background based at least on the estimate of the color and the variation of color. The background may be used to fill the space between the image and the perimeter of the display element. The background generator module 210 will be described in greater detail later in connection with FIGS. 3A, 8, and 9.

The color space converter module 212 may be a hardware-implemented module which may convert the image to a perceptually linear color space. For example, the seller may upload the image in a digital image file format, such as a Joint Photographic Experts Group ("JPG") file format, that uses an RGB-based, non-perceptually linear color space instead of a perceptually linear color space. In this case, the color space converter module 212 may serve to convert the image to a selected perceptually linear color space. In an alternative embodiment, the display system 200 may omit the color space converter module 212 and may instead modify the averaging and variance algorithms to include a transformation in order to determine the average and variance in the appropriate perceptually linear color space.

The display module 214 may be a hardware-implemented module which may provide, for display on a device, the arrangement of the image in the display element with the background fill filling at least a portion of the space defined between the image and the display container. It will be appreciated that "providing for display" may mean providing data associated with a web page to a client device for displaying the webpage one the client device. Alternatively, it may mean rendering, or causing a display of the client device to render, the webpage on a display of the device.

Example User Interfaces

Figure 3A:
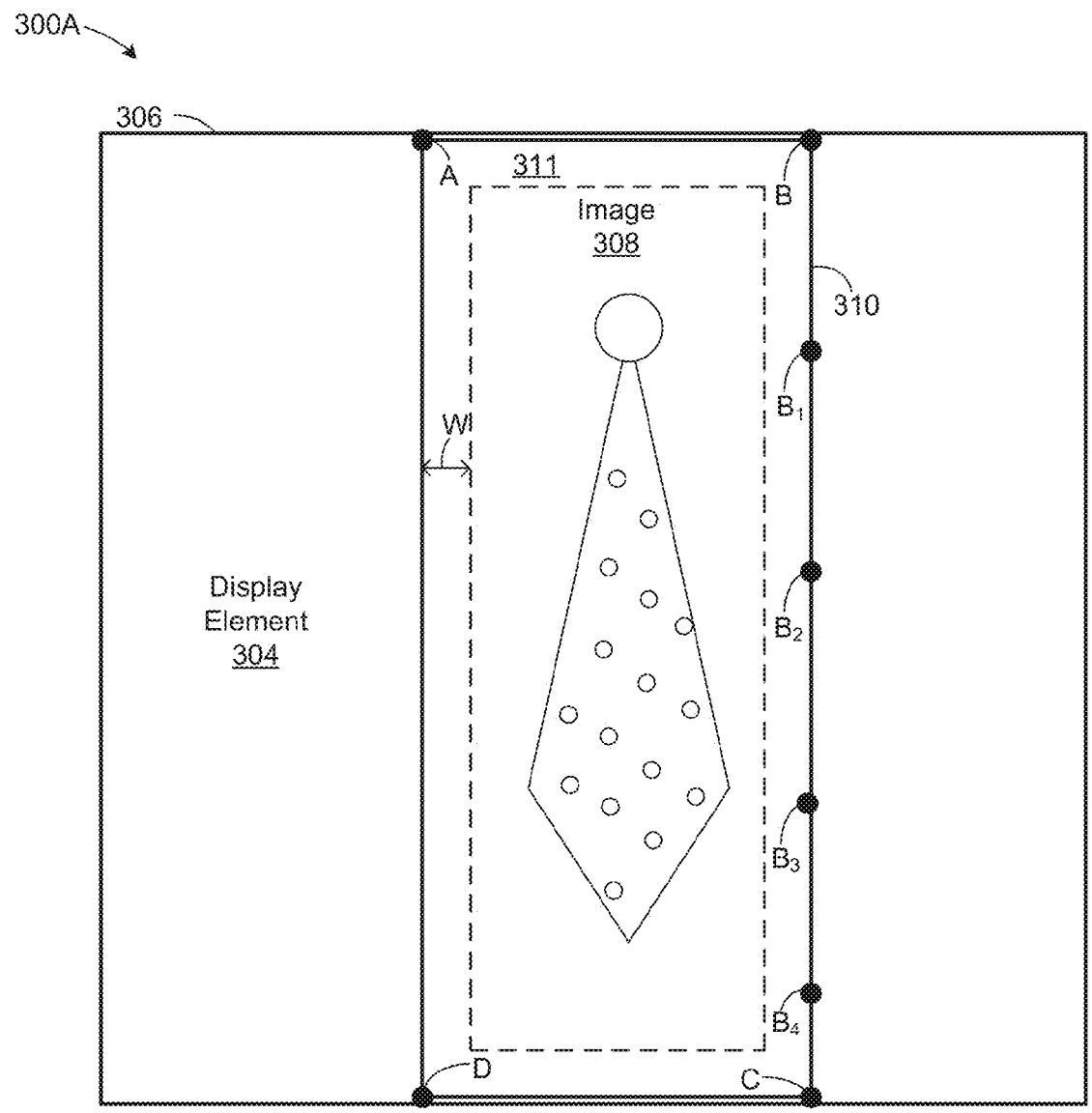
FIGS. 3A-3C are interface diagrams illustrating example user interfaces, according to example embodiments.

FIG. 3A is an interface diagram illustrating an example user interface 300A, according to an example embodiment. The user interface 300A includes a display element 304 having a perimeter 306 and an image 308 having a perimeter 311. The user interface 300A may be presented to a user on the display of a client device (e.g., client device 110). In this example, the user interface 300 corresponds to a graphical user interface of an application implemented on the client device or of a web resource, such as a webpage, of a listing of an item (e.g., the view item page) or a listing of a plurality of items (e.g., a listings page produced from a search query). In one embodiment, the graphical interface module 202 may determine the arrangement of the image 308 in the display element 306. The image 308 may be expanded within the display element 304 in order to fill as much as the display element as possible without changing the aspect ratio of the image 308.

As shown, if the image 308 and the display element 304 have different aspect ratios, the perimeters 306, 310 define a space between the perimeters 306, 310. In order to improve the display of the display element 304 on the user's device, the display system 200 may automatically determine a background fill (for example, a background color) to fill the space based on the colors of the image 304. For example, as will be described in greater detail below, the color detection and background generation modules 208, 210 can be configured to determine the background fill based on determining one or more averages and one or more corresponding variances of a portion of the image 308. In an example embodiment, a portion 311 around the perimeter having a width W can be used to determine the background fill. In one example embodiment, the width can be about 1% to about 5% of a height or width of the image. Additionally or alternatively, the width W can be selected from a range of about 2 pixels to about 10 pixels. It will be appreciated that any suitable width W may be used in alternative embodiments. The portion 311 is shown, by way of example, as a connected subset of the image 308 that runs completely around the perimeter 310. However, in alternative embodiments, portion 311 may not completely cover the perimeter 310, and/or may be formed from one or more connected or unconnected subsets of the image 308.

For example, in an alternative embodiment, the background fill may be determined by analyzing the portion 311 one side at a time. For example, separate averages and variances can be determined for the respective sides AB (for example, the pixels of the portion 311 that are most W pixels from the side defined by the line formed between point A and point B), BC (for example, the pixels of the portion 311 that are most W pixels from the side defined by the line formed between point B and point C), CD (for example, the pixels of the portion 311 that are most W pixels from the side defined by the line formed between point C and point D), and/or DC (for example, the pixels of the portion 311 that are most W pixels from the side defined by the line formed between point A and point D). In one embodiment, if the sides AB and CD extend to the perimeter 306 of the display element 306 (thus, there is no space defined between those sides and the display element 306), then the averages and variances of the part of the portion 311 corresponding to sides BC and AD can be used to the determine the background fill (and sides AB and CD may be omitted from the calculation).

In an example embodiment, a gradient background fill can be determined. For example, in some situations, for example due to uneven lighting, the image 308 may display a background having a gradient-like background. For example, the lighting of the background of the image may be brighter at one corner of the image 308 (e.g., point B) then at another corner (e.g., point C). The display system 200 may generate a background fill having a gradient that matches, for a pleasing aesthetic, approximately the gradient of the background of the image 308. In one embodiment, the color detection module 208 and the background generator model 210 may be configured to generate background colors (e.g., the product of adjusting the saturation level of the estimate of color) for a plurality of points along an edge. In the illustrated embodiment, the color detection module 208 in the background generator module 210 may be configured to generate background colors for each of the segments $BB_1$, $B_1B_2$, $B_2B_3$, $B_3B_4$, and $B_4C$. Each of the background colors may correspond to the respective (sub-)background fills for the corresponding segments. Additionally or alternatively, a background fill corresponding to the whole side BC and having a smooth gradient may be provided by interpolating the plurality of background colors that were determined for the segments $BB_1$, $B_1B_2$, $B_2B_3$, $B_3B_4$, and $B_4C$.

Figure 3B:
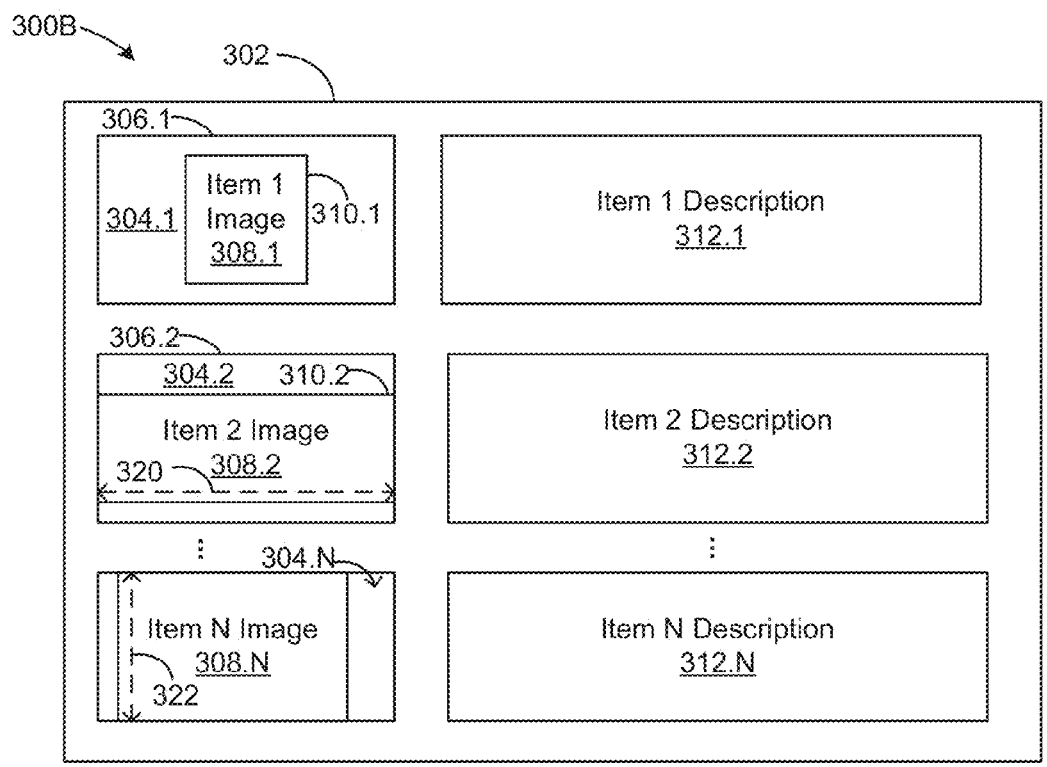

FIG. 3B is an interface diagram illustrating an example user interface 300B, according to an example embodiment. The user interface 300B includes a listings page 302 that is displaying N items. For example, in the illustrated embodiment, item 1 includes a display element 304.1 having a perimeter 306.1, an image 308.1 having a perimeter 310.1, and a description element (e.g., a text box) 312.1. Item 2 includes a display element 304.2 having a perimeter 306.2, an image 308.2 having a perimeter 310.2, and a description element 312.2. Item N includes a display element 304.N having a perimeter 306.N, an image 308.N having a perimeter 310.N, and a description element 312.N.

The illustrated embodiment of FIG. 3B shows that the image 308.1 of Item 1 does not completely fill the display element 304.1 in either the vertical or horizontal dimensions (or "axis"). Accordingly, Item 1 defines a letterbox defining space between all sides of the image 308.1 and the display element 304.1. Alternatively, the image 308.2 of Item 2 does not completely fill the display element 304.2 in the vertical axis but fills the display element 304.2 in the horizontal axis 320. For example, the graphical interface module 202 may be configured to expand the image 308.2 until the image 308.2 extends to the display element 306.2 along the axis 320. Accordingly, Item 2 defines a letterbox defining space between the top and bottom sides of the image 308.2 and the display element 304.2. Alternatively, the image 308.N of Item N does not completely fill the display element 304.N in the horizontal axis but fills the display element 304.N in the vertical axis 322. For example, the graphical interface module 202 may be configured to expand the image 308.N until the image 308.N extends to the display element 306.N along the axis 322. Accordingly, Item N defines a letterbox defining space between the left and right sides of the image 308.N and the display element 304.N.

Figure 3C:

FIG. 3C is an interface diagram illustrating an example user interface 300C, according to an example embodiment. The user interface 300C may correspond to a view item page displaying one image 308. In the illustrated embodiment of FIG. 3C, the image 308 is arranged with a border 314 placed around the edges of the image 308. For example, the background generator module 210 may have determined in this case that the variance of color of the border pixels of the image 308 may have a variance that exceeds a predetermined threshold. Accordingly, the background generator module 210 may be configured to generate a desaturated matte color to fill the letterbox space to the right and left sides of the image 308 in the display container 304, and to place a border 314 around the image 308.

It will be understood by a person of ordinary skill that other embodiments of the user interfaces 300A, 300B, 300C need not include each element of FIGS. 3A, 3B, and 3C, and other embodiments may include more or less elements.

Example Data Structure

Figure 4:
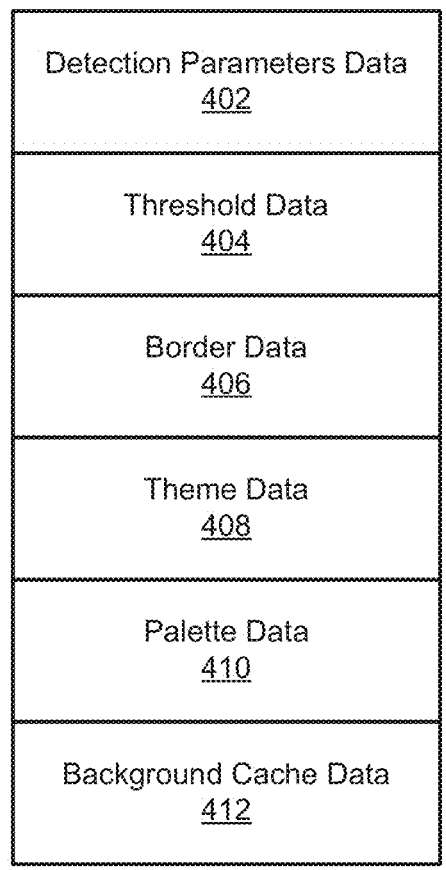
FIG. 4 is a block diagram illustrating an example data structure including data fields for determining background fill, in accordance with an example embodiment.

FIG. 4 is a block diagram illustrating an example data structure 400 including data fields for determining background fill, in accordance with an example embodiment. The data structure 400 may be stored in a database 126 communicatively coupled to the network-based marketplace 102. Alternatively, one or more of the elements of the data structure 400 may be included by any of the servers or client devices of FIG. 1.

The illustrated data structure 400 of FIG. 4 includes a detection parameters data field 402, a threshold data field 404, a border data field 406, a theme data field 408, a palette data field 410, and a background cache data field 412, and the like data related to a determining background fill. The detection parameters data field 402 can correspond to one or more parameters of the color detection module 208, such as the coefficients or weights used for determining an average color. The threshold data field 404 can correspond to one or more thresholds that can be used to determine a background fill, as will be described in connection with FIG. 9. The border data field 406 can correspond to specifying the width W of the portion 311 about the perimeter 310 of the image 308, as well as data indicative of how the sides will be partitioned for determining the average color and the color variation (e.g., around the complete perimeter, one or more sides, sub-portions of along the sides, etc.). The theme data field 408 can correspond to data indicative of a theme of the graphical user interface. In some embodiments, the indication of the theme may serve to determine the background fill. For example, the display system 200 may determine a color for the background fill that is consistent with the color scheme of the theme of the user interface. The palette data filed 410 can correspond to one or more selectable colors for the background fill. As will be discussed below, the display system 200 may select a background color from one or more colors. The background cache data field may correspond to previous background fill determinations. In an example embodiment, the background cache data field may include one or more pairs of picture identification data and background fill data. Accordingly, background fill for an image received for display in a display element may be determined by searching the background cache data filed 412 for a background fill that was previously determined for that image.

Example Process for Determining a Background Fill

Figure 5:
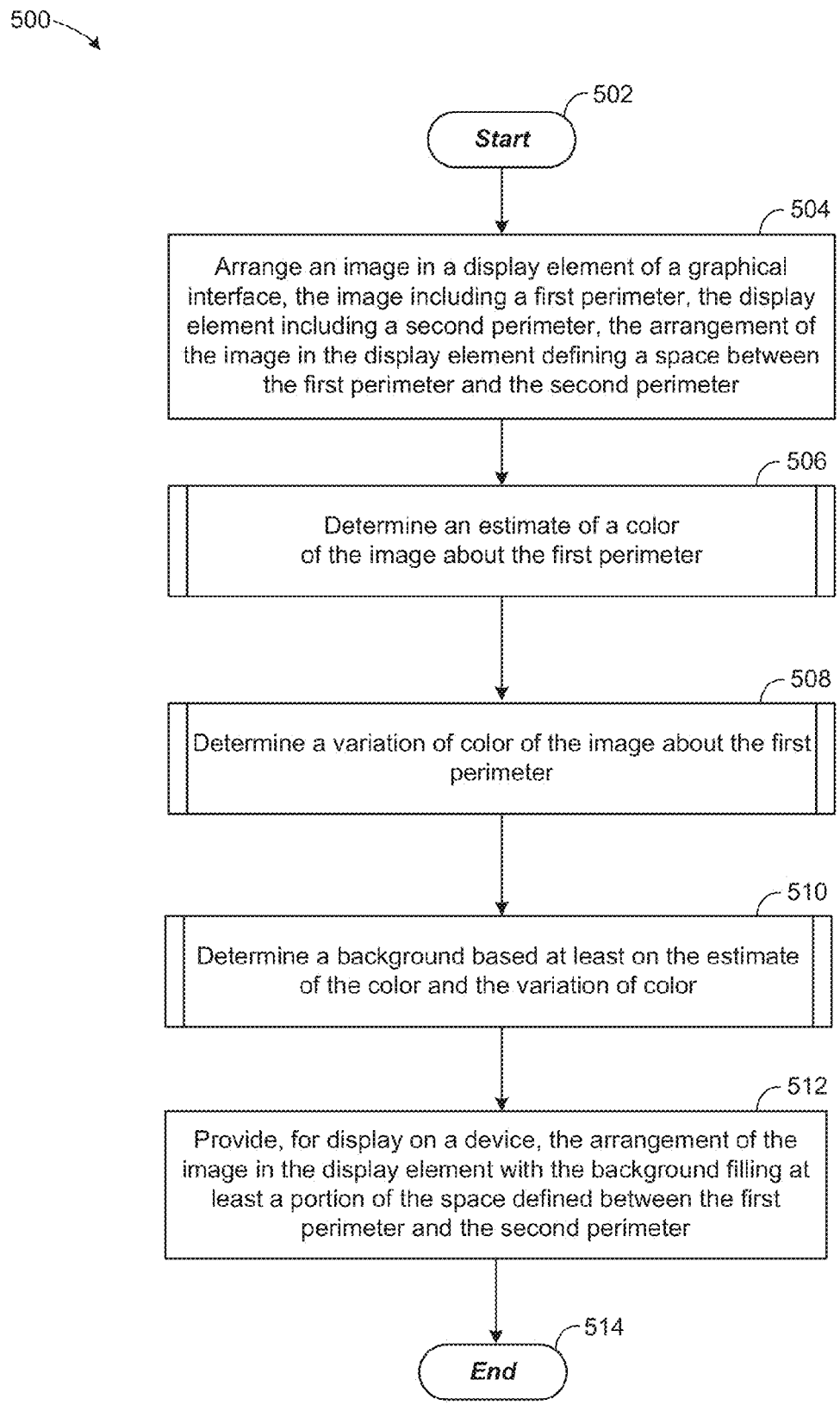
FIG. 5 is a flowchart illustrating a method for displaying an image in accordance with an example embodiment.

FIG. 5 is a flowchart illustrating a method 500 for displaying an image in accordance with an example embodiment. In this example, the method 500 may include operations such as arranging an image 504, determining an estimate of a color 506, determining a variation of color of the image 508, determining a background 510, and providing the arrangement of the image in the display element with the background 512. The example method 500 will be described, by way of explanation, below as being performed by certain modules. It will be appreciate, however, that the operations of the example method 500 can be performed in any suitable order by any number of the modules shown in FIG. 2.

At operation 502, the method 500 starts at block 502 and proceeds to block 504 for arranging an image in a display element of a graphical interface. The arrangement of the image in the display element may define a space between the perimeter of the image and the perimeter of the display element. For example, the graphical interface may correspond to any of the user interfaces 300A-330C described in FIGS. 3A-3C. In some embodiments, the graphical interface module 202 can perform block 502. Furthermore, the image may be received by the communication module 204. The image may correspond to a product image taken and provided by a user (e.g., a seller).

The method 500 can proceed from block 504 to block 506 for determining an estimate of a color of the image. For example, the color detection module 208 may determine an average color of a portion of the image about the perimeter of the image. As stated, the portion of the image can correspond to a portion of a side of the image, one complete side of the image, or the complete perimeter of the image. For example, the portion may correspond to the portion 311 described in connection with FIG. 3A and having a width W. In one embodiment, the average color is determined in a perceptually linear color space. If the image does not color in a linear color space, then the color space converter module 212 may serve to convert the image to a linearly perceptive color space.

At block 508, the method 500 can include determining a variation of color of the image about the perimeter. The variation can correspond to any suitable measure of dispersion of the color of the image. For instance, in an example embodiment, the background generator module 210 can determine a standard deviation or a variance (for example, a statistical variance) of the color of the portion used in block 506. Like block 506, the variation can be determined in a linearly perceptive color space.

At block 510, the method 500 can determine a background fill based at least on the estimate of the color and the variation of color. For example, the background generator module 210 can be configured to generate the background as an output. As stated, the level of desaturation may be based on a relationship of the amount of border variance to the amount of desaturation. This process of desaturating the average color of the border by may be implemented with linear/proportional desaturation, an exponential-like desaturation, or a threshold-based desaturation. Additionally or alternatively, if the variance of color is greater than a predetermined threshold, then the background generator module 210 can be configured to generate a border to be placed around the perimeter of the image.

Additionally or alternatively, the method can repeat blocks 506-510 for a plurality of portions about the perimeter of the image in order to detect a plurality of background colors. For example, the plurality of average colors may be used to determine a background fill having a color gradient in order to match a color gradient of the image, as described in connection with FIG. 3A. Accordingly, the background generator module 214 can be configured to determine the background fill by generating a background fill having a gradient that is generated by interpolating the plurality of background colors.

After determining the background fill, the method 500 proceeds to block 512 for providing the arrangement of the image in the display element for display on a user device. In particular, the background fill may fill at least a portion of the space defined between the image and the perimeter of the display element. In one embodiment, the providing of the block 512 can be performed by display module 214.

Figure 6:
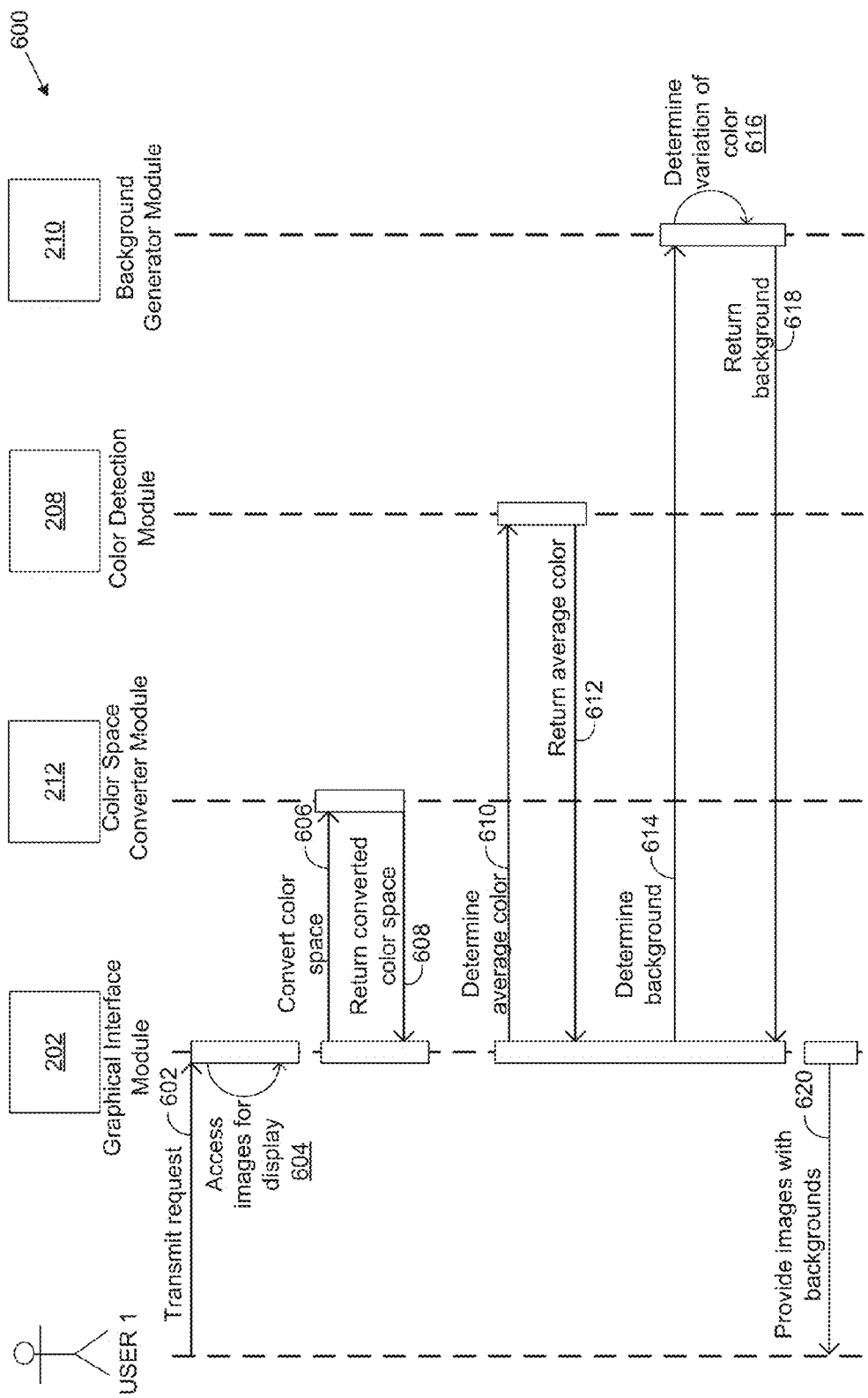
FIG. 6 is an interaction diagram illustrating a method of providing an image with a background fill, in accordance with an example embodiment.

FIG. 6 is an interaction diagram illustrating a method 600 of providing an image with a background fill, in accordance with an example embodiment. In particular, FIG. 6 illustrates interactions between various components of the network system 100, according to an example embodiment. Specifically, FIG. 6 illustrates interactions of a user and components of the display system 200 of FIG. 2.

At operation 602, User 1 transmits a request that causes one or more images to be displayed on the device of the user. For example, the request can correspond to action that causes a view item page to be presented. Alternatively, the request may correspond to a search request or browsing activity wherein a listings page is displayed on the user's device. Each of the pages may include a display element for displaying the one or more images.

At operation 604, a graphics interface module 202 accesses the images for display on the user's device. For example, the graphic interface module 202 can be configured to access the images from the database 126 of FIG. 1. If the images are not in a perceptually linear color space, at operation 606 the graphic interface module 202 provides the color space converter module 212 the images for conversion to a perceptually linear color space. For example, images may be stored in the database as JPEG image files using an RGB-type color space. After the color space converter module 212 converts the color spaces of the images, the color space converter module 212 returns the images in the converted color space to the graphical interface module 202.

At operation 610, the graphical interface module 202 calls the color detection module 208 for determining an average color of the image. For example, as stated, the color detection module 208 can determine an average color along a portion of a perimeter of the image. At operation 612, the color detection module 208 returns the average color value to the graphical interface module 202.

At operation 614, the graphical interface module 202 calls the background generator module 210 for determining the background fill. For example, the graphical interface module 202 can provide the background generator module 210 the image in the perceptually linear color space and the average color determined at operation 610 as inputs. At operation 616, the background generator module 210 can determine a variation of the color of the image. For example, the background generator module 210 can determine a standard deviation of the color of the portion of the image about the average color determined at operation 610. The background generator module 210 can determine the background fill based at least on the average color and the variation of color. For example, the background generator module 210 can set the background fill to a color corresponding to the average color desaturated by an amount based on the variation of color.

In one embodiment, the amount of desaturation varies substantially monotonically with the variation of color. For example, the amount desaturation can vary substantially linearly with the variation of color. It will be appreciated, however, that other relationships can be used to the amount desaturation based on the variation of color. In alternative embodiments, the relationship may be nonlinear, such as exponentially related, as well as continuous or discontinuous relationships.

Additionally or alternatively, the amount of desaturation can be determined by comparing the amount of color variation to a predetermined threshold. For example, in an embodiment, the threshold can correspond to a measured standard deviation of greater than about 25% of the color space numeric range. In an alternative embodiment, the threshold can be selected from a range of about 20% to about 80% of the color space numeric range. If the threshold is exceeded, then the background fill can be selected to be a substantially desaturated color, such as gray, beige, tan, or the like colors. Alternatively, if the amount of variation of color is below the predetermined threshold, then the average color may be selected to be used as the background fill without any desaturation applied.

Additionally or alternatively, the background fill may be determined based on selecting one of a plurality of candidate background fill colors. The candidate background fill color may be selected based on the average color in the variation of color. For example, the candidate background fill colors can be included in a lookup table indexed by the average color and the variation of color. Moreover, one example embodiment, the theme of the graphical interface may serve as a third index into the lookup table of candidate background fill colors. In this way, background fill colors can be selected in a way that is coherent with the theme of the graphical interface.

Yet another embodiment, the background generator module 210 may be configured to generate a background fill having a color gradient. For example, the color gradient can be determined based on the plurality of average colors and variations of colors determined over a plurality of subsets of a portion about the perimeter of the image. The subsets can correspond to a partition of a side of the image, for example, as shown in FIG. 3A (e.g., as delineated by points B, B1-B4, and C). Accordingly, background colors may be determined for each of the subsets. The background fill can have a gradient as determined by interpolating the background colors of the subsets.

At operation 618, the background generator module 210 returns the background fill data to the graphical interface module 202. At operation 620, the graphical interface module 202 provides the image with the background fill to the User 1. For example, the graphical interface module 202 provides the display element with the image contained inside and the background fill cover at least a portion of the space between the image and the perimeter of the display element.

Figure 7:
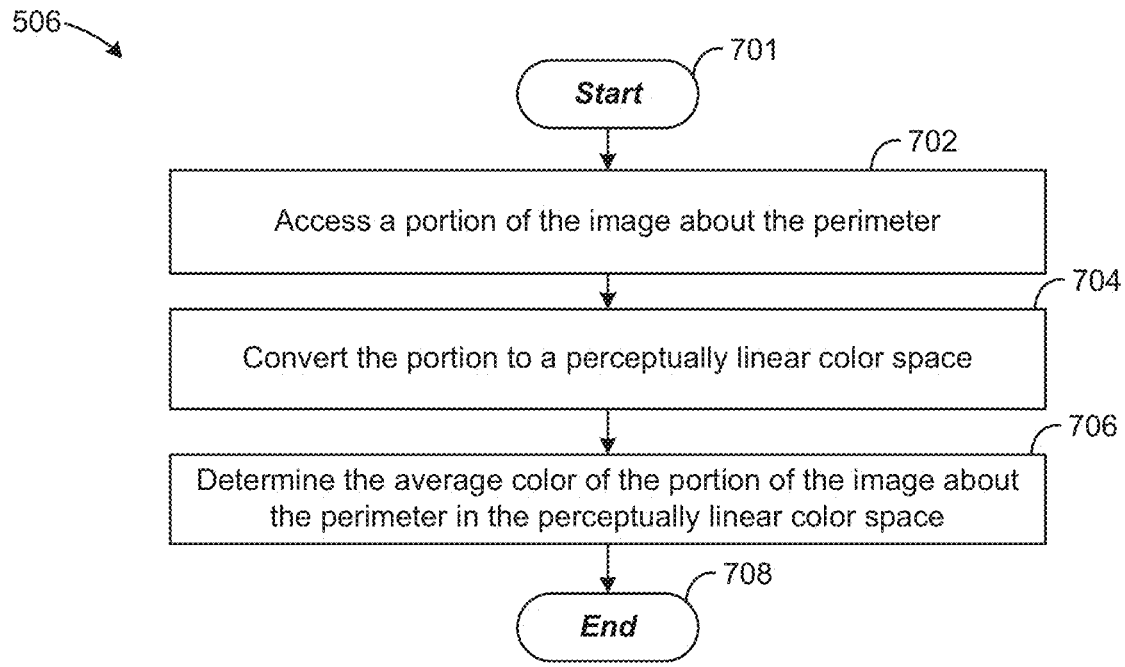
FIG. 7 is a flowchart illustrating a method for determining the average color a portion of an image, in accordance with an example embodiment.

FIG. 7 is a flowchart illustrating a method 506 for determining the average color a portion of an image, in accordance with an example embodiment. In this example, the method 506 may include operations such as accessing a portion of the image 702, converting the portion to a perceptually linear color 704, and determining the average color 706. The example method 506 will be described, by way of explanation, below as being performed by certain modules. It will be appreciated, however, that the operations of the example method 506 can be performed in any suitable order by any number of the modules shown in FIG. 2. Moreover, more or less operations may be included by the example method 506. For example, block 704 may be omitted in embodiments that either access images already in a perceptually linear color space or in embodiments that determined the average in a color space other than a perceptually linear color space.

The method 506 starts at block 701 and proceeds to block 702 for accessing a portion of the image about the perimeter of the image. For example, graphical interface module 202 may access the image for display via the database. At block 704, the method 506 includes converting the portion to a perceptually linear color space. For example the color space converter module 212 may receive the image from the graphical interface module 202 as an input and return the converted image to the graphical interface module 202 as an output. At block 706, the method 506 can include determining the average color of the portion of the image about the perimeter in the perceptually linear color space. For example, the color detection module 208 can receive the image in the converted color space as an input and can provide the average color as an output. The average color can serve as an estimate of a color of the image about the first perimeter.

Figure 8:
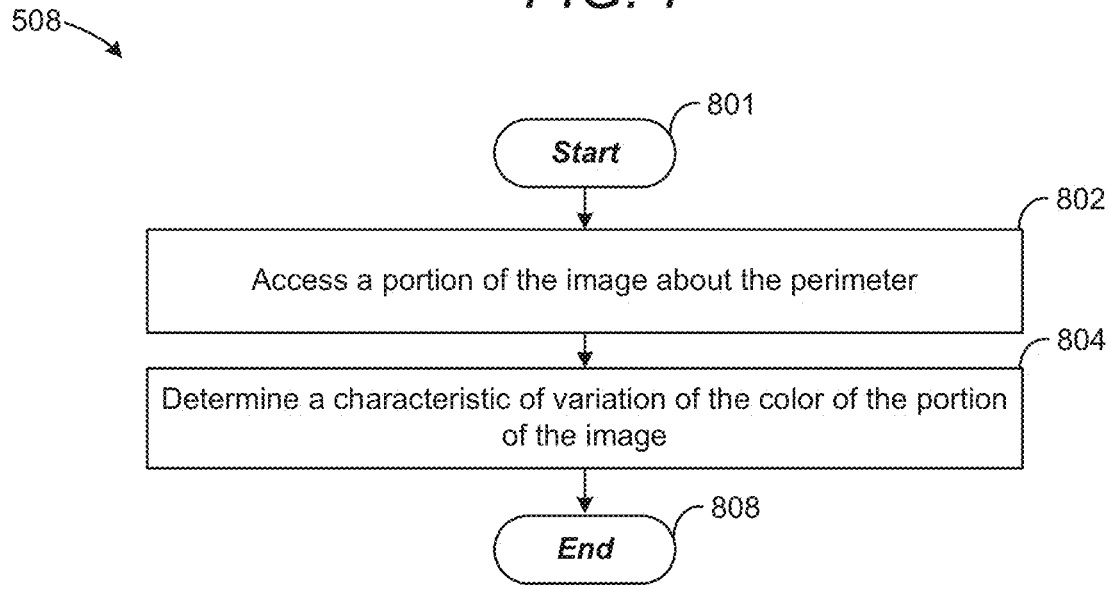
FIG. 8 is a flowchart illustrating a method for determining a characteristic of variation of color, in accordance with an example embodiment.

FIG. 8 is a flowchart illustrating a method 508 for determining a characteristic of variation of color, in accordance with an example embodiment. In this example, the method 508 may include operations such as accessing a portion of the image 802 and determining the characteristic of variation of the color 804. The example method 508 will be described, by way of explanation, below as being performed by certain modules. It will be appreciate, however, that the operations of the example method 508 can be performed in any suitable order by any number of the modules shown in FIG. 2.

The method 508 can start at block 801 and proceeds to block 802 for accessing a portion of the image about the perimeter. The portion of the image can correspond to substantially the same portion that was used in determining the estimate of the color of the image about the first parameter at block 506 of FIG. 5. For example, the graphical interface module 202 can access the image from a database.

The image may be provided to the background generator module 210 as an input. At block 804, the method 508 includes determining a characteristic of variation of the color of the portion of the image. For example, the background generator module 210 can receive as inputs the image and the estimate of the color of the image about the perimeter, and can provide background fill as an output. As stated, the background generator module 210 can determine the variance of color about the average color over the portion of the image. In other embodiments, the background generator module 210 can compute standard deviation instead of a variance. At block 808, the method 508 may end.

Figure 9:
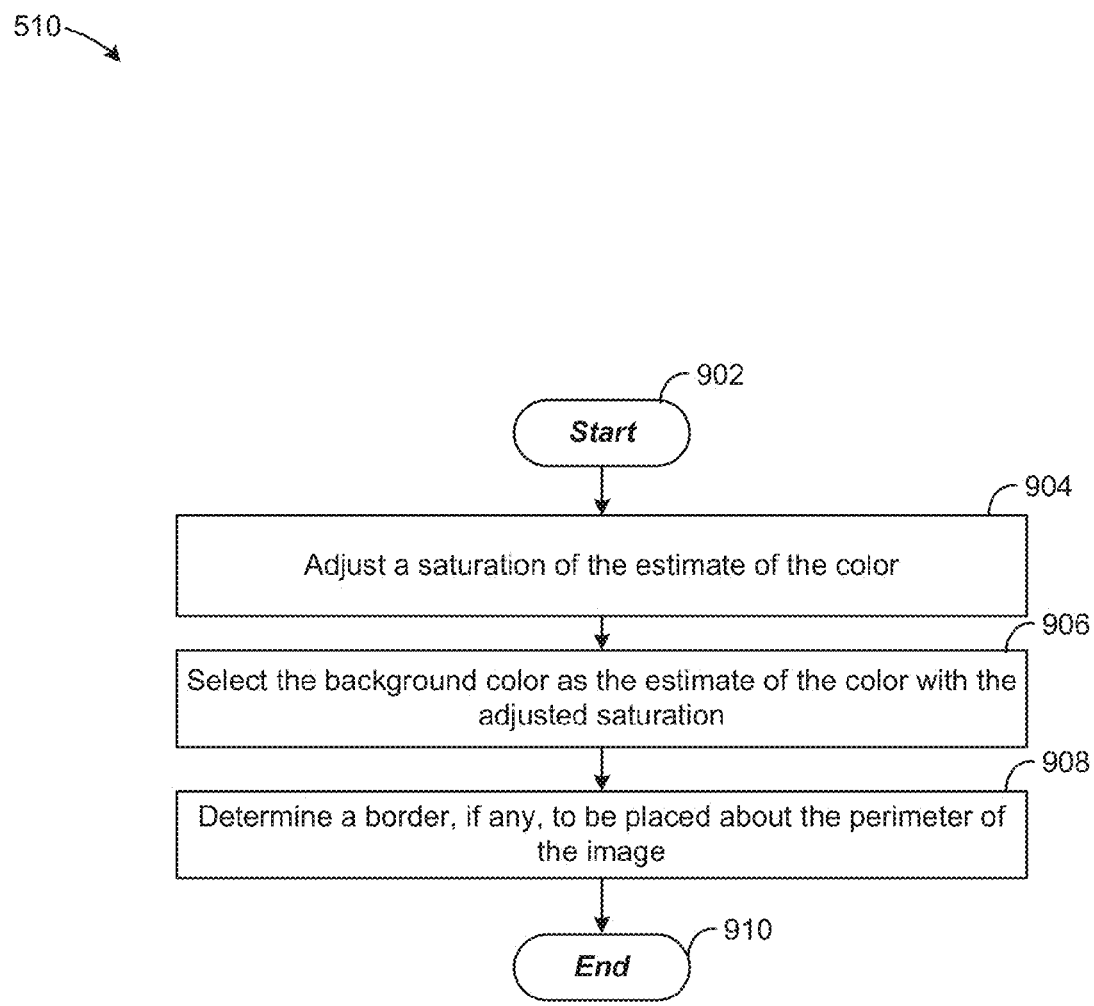
FIG. 9 is a flowchart illustrating a method for determining a background fill, in accordance with an example embodiment.

FIG. 9 is a flowchart illustrating a method 510 for determining a background fill, in accordance with an example embodiment. In this example, the method 510 may include operations such as adjusting saturation 904, selecting a background color 906, and determining a border 908. The example method 510 will be described, by way of explanation, below as being performed by certain modules. It will be appreciate, however, that the operations of the example method 510 can be performed in any suitable order by any number of the modules shown in FIG. 2.

The method 510 can start at block 902 and proceeds to block 904 for adjusting the saturation of the estimate of the color. For example, the estimate of the color can be provided in accordance with the method of block 506 described in connection with FIGS. 5 and 7. At block 906, the method 510 includes selecting the background color as the estimate of the color with the adjusted saturation. At block 908, the method 510 includes determining a border to be placed about the perimeter of the image. For example, in an example embodiment, if the variation of color of the portion about the perimeter exceeds a predetermined threshold then a border, such as a 2-D border or a drop shadow border, may be positioned about the perimeter of the image. For example, in one embodiment, a border may be applied if the measured standard deviation is greater than a threshold corresponding to greater than about 25% of the color space numeric range. The background generator module 210 may provide the graphical interface module 202 the background fill as determined by blocks 904-908. At block 910, the method 510 may end.

Example Mobile Device

Figure 10:
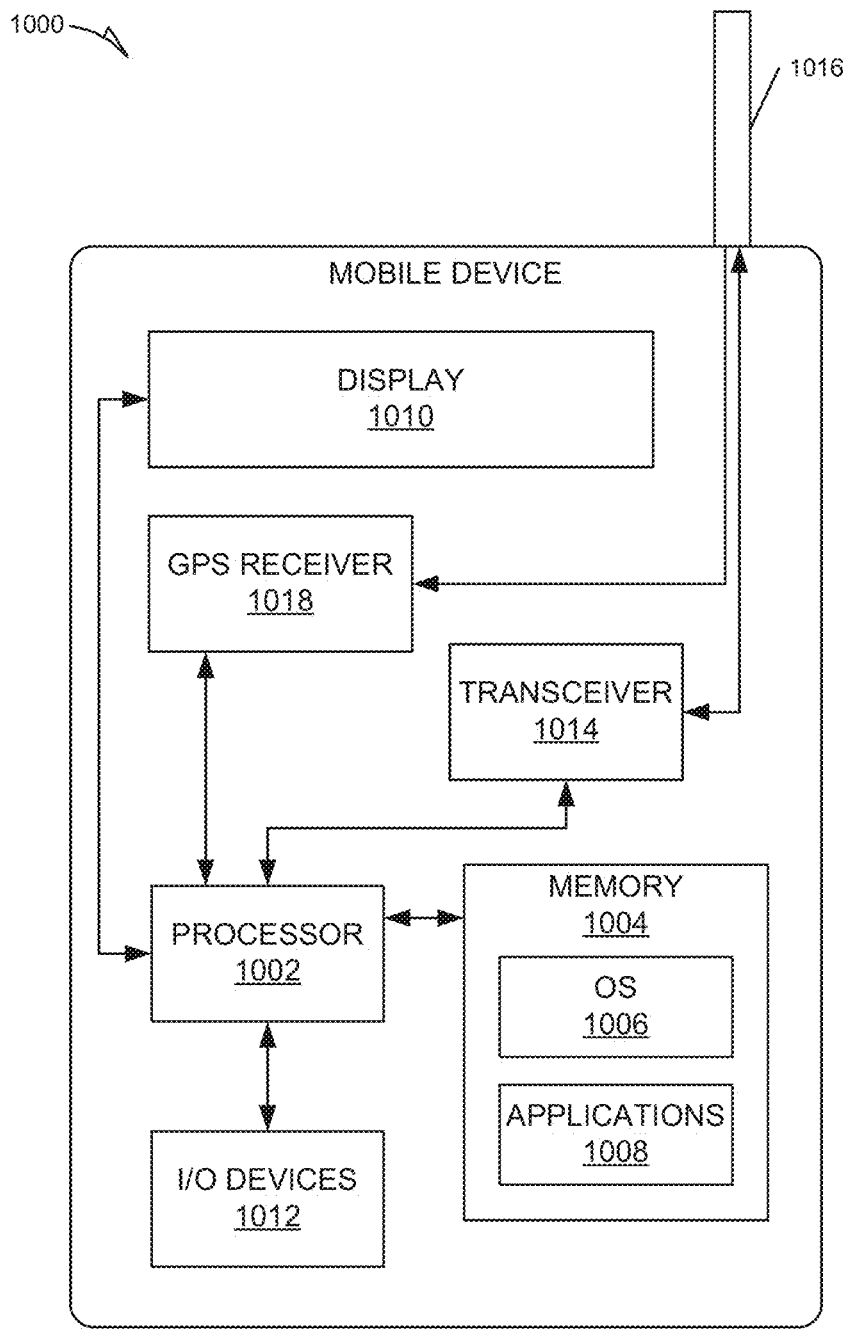
FIG. 10 is a block diagram illustrating a mobile device, according to an example embodiment.

FIG. 10 is a block diagram illustrating a mobile device 1000, according to an example embodiment. The mobile device 1000 may include a processor 1002. The processor 1002 may be any of a variety of different types of commercially available processors suitable for mobile devices (for example, an XScale architecture microprocessor, a Microprocessor without Interlocked Pipeline Stages (MIPS) architecture processor, or another type of processor). A memory 1004, such as a random access memory (RAM), a Flash memory, or other type of memory, is typically accessible to the processor. The memory 1004 may be adapted to store an operating system (OS) 1006, as well as application programs 1008, such as a mobile location enabled application that may provide Location Based Services (LBSs) to a user. The processor 1002 may be coupled, either directly or via appropriate intermediary hardware, to a display 1010 and to one or more input/output (I/O) devices 1012, such as a keypad, a touch panel sensor, a microphone, and the like. Similarly, in some embodiments, the processor 1002 may be coupled to a transceiver 1014 that interfaces with an antenna 1016. The transceiver 1014 may be configured to both transmit and receive cellular network signals, wireless data signals, or other types of signals via the antenna 1016, depending on the nature of the mobile device 1000. Further, in some configurations, a GPS receiver 1018 may also make use of the antenna 1016 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
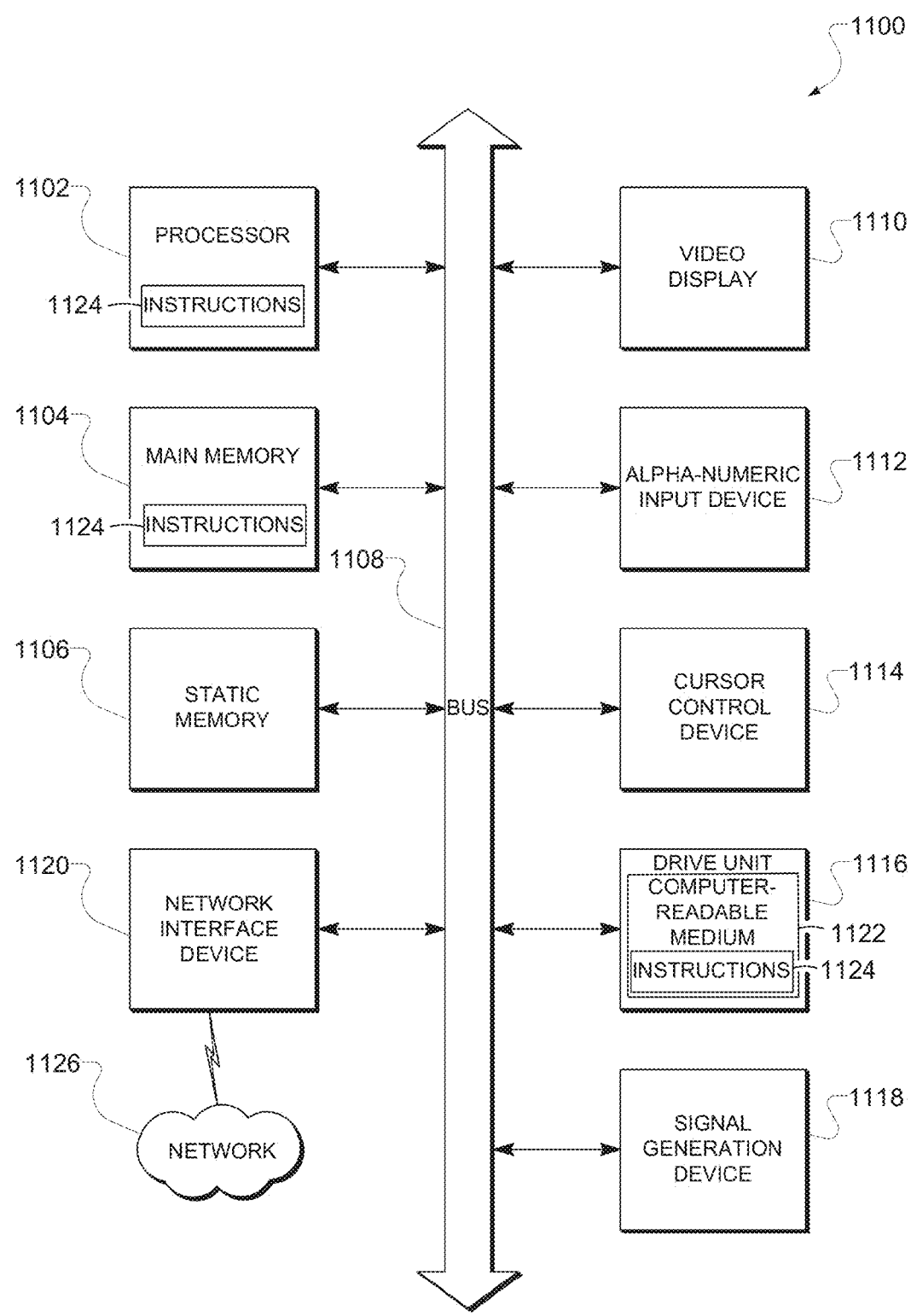
FIG. 11 is a block diagram of machine in the example form of a computer system within which instructions, for causing the machine to perform any one or more of the methodologies discussed herein, may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any non-transitory, tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A system comprising:
    a processor of a machine;
    a graphical interface module configured to arrange an image in a display element of a graphical interface, the image including a first perimeter, the display element including a second perimeter, the arrangement of the image within the display element defining a space between the first perimeter of the image and the second perimeter of the display element;
    a color detection module configured to determine, using the processor, an estimate of a color of a portion of the image about the first perimeter by determining a central tendency of the color of the portion of image about the first perimeter;
    a background generator module configured to determine a variation of the color of the portion of image about the first perimeter with respect to the estimate of the color, the background generator module being further configured to determine a background based at least on the estimate of the color and the variation of the color, the background generator module being further configured to fill at least a portion of the space in the display element defined between the first perimeter and the second perimeter with the determined background; and
    a display module configured to provide, for display on a device, the image within the display element with the determined background.

2. The system of claim 1, wherein the color detection module is further configured to determine the estimate of the color by determining an average color of the portion of the image about the first perimeter, the estimate of the color being based at least on the average color.

3. The system of claim 2, wherein the average color is determined in a first color space type including at least one of a CIE 1976 color space, a CIELUV color space, a CIELAB color space, or a CIEUVW color space.

4. The system of claim 3, further comprising a color space converter module configured to convert the portion of the image from a second color space type to the first color space type, the average color being based at least on the portion of the image converted to the first color space type.

5. The system of claim 1, wherein the graphical interface module being further configured to scale the image in the display element such that the first perimeter extends, along an axis, to the second perimeter, and the portion of the image at least partly defining the space between the first perimeter and the second perimeter.

6. The system of claim 1, wherein the background generator module is configured to determine a background color by adjusting a saturation of the estimate of the color, the saturation being adjusted based on the variation of the color.

7. The system of claim 6, wherein the background generator module is configured to adjust the saturation of the estimate of the color by comparing the variation of the color and a predetermined threshold, wherein the background generator module is further configured to adjust the saturation to a gray value if the variation of the color is greater than the predetermined threshold and, otherwise, to not adjust the saturation.

8. The system of claim 6, wherein the background generator module is further configured to adjust saturation of the estimate of the color by using a continuous, decreasing function of the variation of the color.

9. The system of claim 6, wherein the background generator module is further configured to determine the background by selecting, based on the estimate of the color and the variation of the color, one of a plurality of predetermined backgrounds.

10. The system of claim 9, wherein the plurality of predetermined backgrounds is determined based on a theme of the graphical interface.

11. The system of claim 1, wherein the background generator module is configured to adjust the saturation of the estimate of the color by comparing the variation of the color to a predetermined threshold, wherein the background generator module is configured to generate the background including a border for placing around the first perimeter if the variation of the color is greater than the predetermined threshold.

12. The system of claim 1, wherein the background generator module is configured to detect a color gradient of the portion of the image about the first perimeter, the background generator module being further configured to determine the background to have a color gradient matching the color gradient of the portion of the image.

13. The system of claim 1, wherein the graphical interface module is further configured to access a plurality of images including the image, the accessing being responsive to receiving an indication to display a list containing the plurality of images.

14. A method for determining backgrounds, the method comprising:
  arranging an image in a display element of a graphical interface, the image including a first perimeter, the display element including a second perimeter, the arrangement of the image within the display element defining a space between the first perimeter of the image and the second perimeter of the display element;
  determining, using one or more processors, an estimate of a color of a portion of the image about the first perimeter by determining a central tendency of the color of the portion of the image about the first perimeter;
  determining a variation of the color of the portion of the image about the first perimeter with respect to the estimate of the color;
  determining a background based at least on the estimate of the color and the variation of the color;
  filling at least a portion of the space in the display element defined between the first perimeter and the second perimeter with the determined background; and
  providing, for display on a device, the image in the display element with the determined background.

15. The method of claim 14, wherein the determining of the estimate of the color includes determining an average color of the portion of the image about the first perimeter, the estimate of the color being based at least on the average color.

16. The method of claim 15, wherein the determining of the average color is determined in a first color space type including at least one of a CIE 1976 color space, a CIELUV color space, a CIELAB color space, or a CIEUVW color space.

17. The method of claim 16, further comprising converting the portion of the image from a second color space type to the first color space type, the average color being based at least on the portion of the image converted to the first color space type.

18. The method of claim 14, wherein the determining of the background color comprises adjusting a saturation of the estimate of the color, the saturation being adjusted based on the variation of the color.

19. A non-transitory machine-readable storage medium embodying instructions that, when executed by a machine, cause the machine to perform operations comprising:
  arranging an image in a display element of a graphical interface, the image including a first perimeter, the display element including a second perimeter, the arrangement of the image within the display element defining a space between the first perimeter of the image and the second perimeter of the display element;
  determining, using one or more computer processors, an estimate of a color of a portion of the image about the first perimeter by determining a central tendency of the color of the portion of the image about the first perimeter;
  determining a variation of the color of the portion of the image about the first perimeter with respect to the estimate of the color;
  determining a background based at least on the estimate of the color and the variation of the color;
  filling at least a portion of the space in the display element defined between the first perimeter and the second perimeter with the determined background; and
  providing, for display on a device, the image in the display element with the determined background.

20. The machine-readable storage medium of claim 19, wherein the determining of the estimate of the color includes determining an average color of the portion of the image about the first perimeter, the estimate of the color being based at least on the average color.

* * * * *

UNITED STATES PATENT AND TRADEMARK OFFICE
CERTIFICATE OF CORRECTION

PATENT NO. : 9,519,977 B2
APPLICATION NO. : 14/201683
DATED : December 13, 2016
INVENTOR(S) : Van Tol et al.

Page 1 of 1

It is certified that error appears in the above-identified patent and that said Letters Patent is hereby corrected as shown below:

On the Title Page

In item (73), in "Assignee", in Column 1, Line 1, delete "eBay" and insert --eBay,--, therefor Signed and Sealed this
Twenty-second Day of May, 2018

Andrei Iancu
*Director of the United States Patent and Trademark Office*